(12) United States Patent
Iwaki et al.

(10) Patent No.: US 12,327,490 B2
(45) Date of Patent: Jun. 10, 2025

(54) CONTENT PROVISION SYSTEM, CONTENT PROVISION METHOD, AND CONTENT PROVISION PROGRAM

(71) Applicant: DWANGO Co., Ltd., Tokyo (JP)

(72) Inventors: Shinnosuke Iwaki, Tokyo (JP);
Yoshimasa Kono, Tokyo (JP); Rieko Kunii, Tokyo (JP)

(73) Assignee: Dwango Co., Ltd., Tokyo (JP)

( * ) Notice: Subject to any disclaimer, the term of this patent is extended or adjusted under 35 U.S.C. 154(b) by 0 days.

(21) Appl. No.: 18/043,553

(22) PCT Filed: May 27, 2022

(86) PCT No.: PCT/JP2022/021780
§ 371 (c)(1),
(2) Date: Feb. 28, 2023

(87) PCT Pub. No.: WO2022/255262
PCT Pub. Date: Dec. 8, 2022

(65) Prior Publication Data
US 2024/0096227 A1  Mar. 21, 2024

(30) Foreign Application Priority Data
May 31, 2021  (JP) .................. 2021-091499

(51) Int. Cl.
*G09B 5/02* (2006.01)
*G06T 13/40* (2011.01)
(Continued)

(52) U.S. Cl.
CPC ............... *G09B 5/02* (2013.01); *G06T 13/40* (2013.01); *G06T 15/20* (2013.01); *G09B 5/065* (2013.01); *G09B 5/10* (2013.01); *G06T 2200/24* (2013.01)

(58) Field of Classification Search
CPC .................. G09B 5/02; G06T 13/40
See application file for complete search history.

(56) References Cited

U.S. PATENT DOCUMENTS 7,292,243 B1 * 11/2007 Burke ...................... G09B 5/00
715/764
2011/0123961 A1 * 5/2011 Staplin ................... G09B 9/052
434/64
(Continued)

FOREIGN PATENT DOCUMENTS

JP  2012226669 A  11/2012
JP  2018195177 A  12/2018
(Continued)

OTHER PUBLICATIONS

[English Translation] International Search Report for International Patent Application No. PCT/JP2022/021780, dated Aug. 30, 2022.
(Continued)

*Primary Examiner* — Peter R Egloff
(74) *Attorney, Agent, or Firm* — Dorsey & Whitney LLP

(57) ABSTRACT

A content provision system related to one embodiment includes at least one processor. The processor is configured to: generate action log information that records action information indicating an action of the first avatar operated while the first user views the content and specific action information indicating a timing of performance of a specific action by the first avatar and a detail of the specific action; reproduce the content along with an action of the first avatar based on the action information contained in the action log information, when a second user views the content after the first user viewed the content; and refer to the specific action information contained in the action log information and thereby arrange a display object that indicates the detail of the specific action in association with the first avatar at the
(Continued)

timing of performance of the specific action by the first avatar being reproduced.

20 Claims, 11 Drawing Sheets

(51) Int. Cl.
  *G06T 15/20* (2011.01)
  *G09B 5/06* (2006.01)
  *G09B 5/10* (2006.01)

(56) References Cited

U.S. PATENT DOCUMENTS

| | | | |
|---|---|---|---|
| 2012/0206577 A1* | 8/2012 | Guckenberger | G09B 19/003 348/47 |
| 2013/0109002 A1* | 5/2013 | Howard | G09B 7/00 434/350 |
| 2015/0356780 A1* | 12/2015 | Madegowda | G09B 19/00 345/633 |
| 2017/0319282 A1* | 11/2017 | Jarc | A61B 34/10 |
| 2019/0355281 A1* | 11/2019 | Abe | G09B 5/02 |
| 2020/0379575 A1* | 12/2020 | Banerjee | G06F 3/012 |

FOREIGN PATENT DOCUMENTS

| | | |
|---|---|---|
| JP | 2020017242 A | 1/2020 |
| JP | 2021005052 A | 1/2021 |
| JP | 7047168 B1 | 3/2022 |
| WO | 2022255262 A1 | 12/2022 |

OTHER PUBLICATIONS

"N Prep School Supports VR Education—Over 1,000 extracurricular classes can be taken in VR", https://nnn.ed.jp/news/blog/archives/12425.html, Accessed on Feb. 10, 2023.

* cited by examiner

CONTENT PROVISION SYSTEM, CONTENT PROVISION METHOD, AND CONTENT PROVISION PROGRAM

CROSS REFERENCE TO RELATED APPLICATION(S)

This application is a U.S. National Stage filing under 35 U.S.C. § 371 of PCT Application No. PCT/JP2022/021780, filed May 27, 2022, which claims priority to Japanese Application No 2021-091499, filed May 31, 2021, which are incorporated herein by reference, in their entirety, for any purpose.

TECHNICAL FIELD

One aspect of the present disclosure relates to a content provision system, a content provision method, and a content provision program.

BACKGROUND ART

Patent Document 1 discloses a system that enables a viewer of content that uses a virtual space (3-dimensional virtual space) to newly add an avatar object of the viewer, and that displays the added avatar object on other viewer terminals reproducing the content thereafter.

CITATION LIST

Patent Document

DOCUMENT PATENT 1: Japanese Patent Publication No.6707111

SUMMARY OF THE INVENTION

Technical Problem

When a viewer views content having been viewed by another viewer, the above-described system allows viewing of the content with an avatar of that other viewer in the content, thus allowing the viewer to experience a sense of unity such that he/she is viewing the content with the other viewer. However, the above-described system leaves room for further improvement in terms of improved convenience for a content viewing user.

An object of one aspect of the present disclosure is to provide a content provision system, a content provision method, and a content provision program capable of effectively improving convenience of a content viewing user.

Solution to the Problems

A content provision system according to an aspect of the present disclosure includes at least one processor. The at least one processor is configured to: arrange, in a virtual space, a first avatar corresponding to a first user viewing predetermined content representing the virtual space; generate action log information that records action information indicating an action of the first avatar operated by the first user while the first user views the content and specific action information indicating a timing of performance of a predetermined specific action by the first avatar and a detail of the specific action; reproduce the content along with an action of the first avatar based on the action information contained in the action log information, when a second user views the content after the first user viewed the content; and refer to the specific action information contained in the action log information and thereby arrange a display object that indicates the detail of the specific action in association with the first avatar at the timing of performance of the specific action by the first avatar being reproduced.

In the above-described content provision system, for the second user viewing content after the first user having viewed the content in the past, an action of the first avatar operated by the first user while the first user viewed the content is reproduced. This allows the second user to feel a sense of unity with the other user (the first user) while viewing the content. Furthermore, a display object indicating a specific action performed by the first avatar during content viewing is arranged in association with the first avatar at the timing when that specific action was performed. This way, the detail of the specific action performed by the first avatar can be visually presented to the second user at a suitable timing, as reference information regarding an action that should be taken while viewing the content. As a result, it is possible to effectively improve the convenience of the user (second user) who views the content.

Advantages of the Invention

One aspect of the present disclosure provides a content provision system, a content provision method, and a content provision program capable of effectively improving convenience of a content viewing user.

DESCRIPTION OF EMBODIMENT

Figure 1:
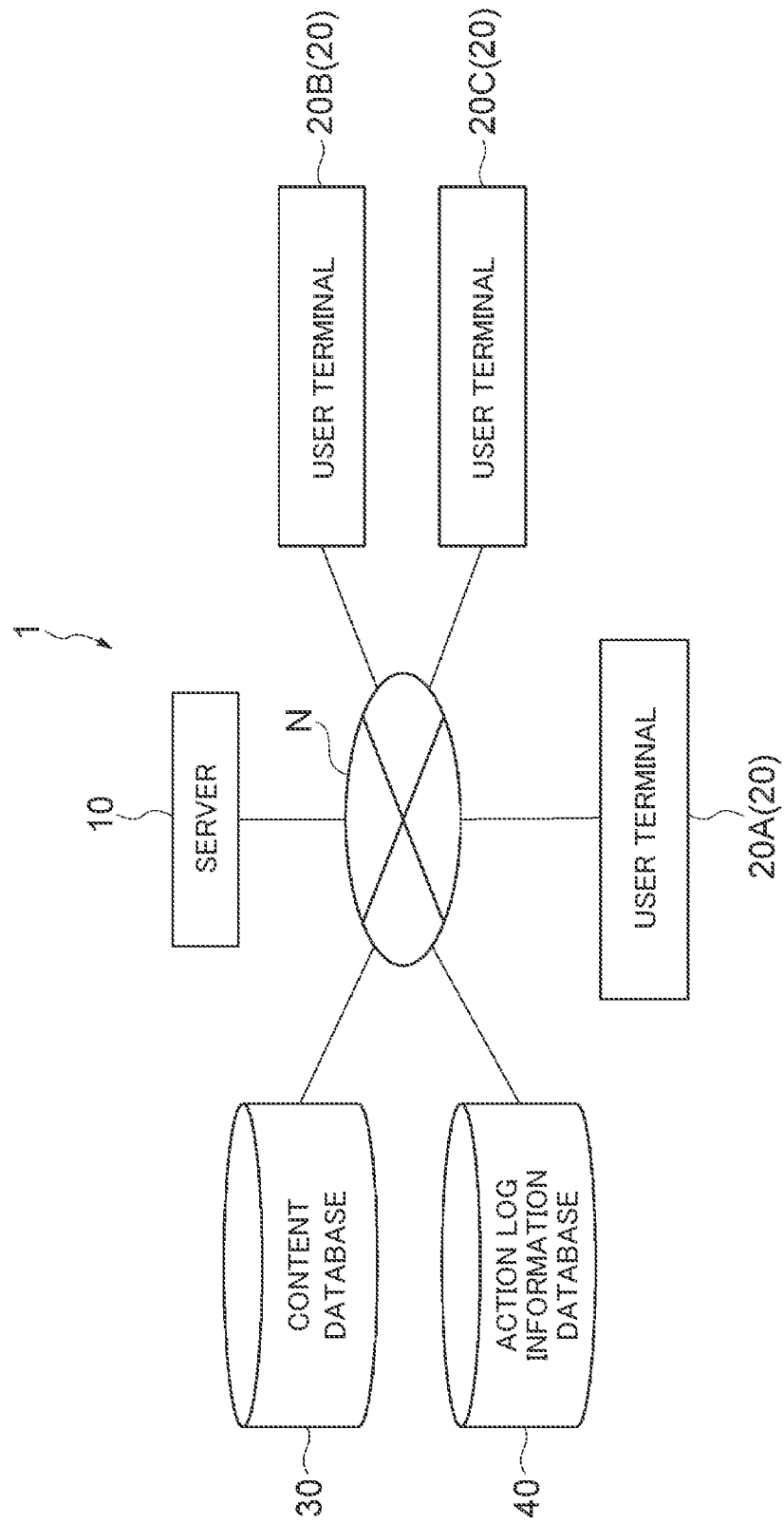
FIG. 1 is a diagram illustrating an exemplary application of a content provision system in accordance with an embodiment.

An embodiment of the present disclosure will be described in detail below with reference to the attached drawings. In the description of the drawings, the same or equivalent elements are denoted by the like reference characters, and their explanations are not repeated.

[Overview of System]

A content provision system according to an embodiment is a computer system that distributes content to users. Content is information provided by a computer or computer system that can be recognized by a person. Electronic data representing the content is referred to as content data. The form of expressing the content is not limited. Content may be expressed, for example, in the form of images (e.g. photographs, videos, etc.), documents, audio, music, or a combination of any two or more of these. The content may be used for various forms of conveying or communicating information. Content may be utilized for a variety of scenes or purposes such as, for example, entertainment, news, education, medical, gaming, chat, commerce, lecture, seminars, training, etc. Distribution is a process of transmitting information to a user via a communication network or a broadcast network.

The content provision system provides content to a user (viewer) by transmitting content data to a user terminal. In one example, the content is provided by a distributor. The distributor is a person who intends to convey information to a viewer, and is a sender of content. The user (viewer) is a person who intends to obtain the information, and is a user of the content.

In the present embodiment, the content is expressed by using at least an image of a virtual space. That is, the content data includes at least a content image showing the content. The content image is an image from which a person can visually recognize some information. The content image may be a moving image (video) or a still image.

In one example, the content image expresses a virtual space with a virtual object. A virtual object is an object that does not exist in the real world and is present only on a computer system. A virtual object is expressed in the form of two-dimensional or three-dimensional computer graphics (CG) using an image material independent of a photographed image. A method of expressing the virtual object is not limited. For example, the virtual object may be expressed by using an animation material, or may be expressed in the form of an image as close to a real object based on a photographed image. The virtual space is a virtual two-dimensional or three-dimensional space presented in the form of an image displayed on a computer. The content image is, for example, an image showing a landscape viewed from a virtual camera set in the virtual space. The virtual camera is a virtual viewpoint set in the virtual space so as to match with the line of sight of the user viewing the content image. The content image or the virtual space may further include a real-world object which is an object actually existing in the real world.

One example of a virtual object is an avatar, which represents the user him/herself. The avatar may be in the form of two-dimensional or three-dimensional computer graphics (CG) using an image material independent of an original image, instead of a photograph of a person him/herself. How the avatar is expressed is not limited. For example, the avatar may be in the form of an animation material, or may be an image as close to a real person based on a photographed image. The position and direction of the virtual camera described above could coincide with the viewpoint and sight of the avatar. In this case, the content image of the first-person viewpoint is provided to the user. This allows the user to view a content image corresponding to the sight from the viewpoint (virtual camera) of the avatar arranged within the virtual space. By viewing the content image, the user can experience augmented reality (AR), virtual reality (VR), or mixed reality (MR).

The content provision system may be used for time-shifting that allows viewing of content in a given period of time after real-time distribution. Alternatively, the content provision system may be used for on-demand distribution which allows viewing of content at any given timing. The content provision system distributes content presented based on content data generated or saved in the past.

In the present disclosure, the expression "transmitting" data or information from a first computer to a second computer means a transmission for final delivery of data or information to the second computer. That is, the expression encompasses a case where another computer or communication device relays data or information in the transmission.

The purpose and use scene of the content are not limited. For example, the content is educational content, in which case the content data is educational content data. An example of the educational content is content used by a teacher to give lessons to students. A teacher refers to a person who teaches academic lessons, techniques, and the like, whereas a student refers to a person who takes the teaching. The teacher is an exemplary distributor, and the student is an exemplary viewer. The teacher may be a person with a teacher's license or a person without a teacher's license. The wording "class" is where the teacher teaches lessons, techniques, and the like to a student. The ages and affiliation of teachers and students are not limited, and therefore, the purpose and the usage scenes of the educational content are not limited. For example, the educational content may be used in various schools such as nursery schools, kindergarten schools, elementary schools, junior high schools, high schools, universities, graduates, specialty schools, preparatory schools, and online schools, or may be used in places or scenes other than schools. In this regard, educational content may be used for a variety of purposes, such as infant education, compulsory education, higher education, lifelong learning, and the like. In one example, the educational content includes an avatar corresponding to a teacher or student, meaning that the avatar appears in at least some scenes of the educational content.

[Overall Configuration of Content Provision System]

FIG. 1 is a diagram illustrating an exemplary application of a content provision system 1 according to the embodiment. In the present embodiment, the content provision system 1 includes a server 10, user terminals 20 (user terminals 20A, 20B, and 20C), a content database 30, and an action log information database 40.

The server 10 is a computer that distributes content data to the user terminals 20. The server 10 is connected to at least one user terminal 20 via a communication network N. One user terminal 20 may be shared by a plurality of users, or each user may have one user terminal 20. In the present embodiment, the server 10 is connected to at least three user terminals 20A, 20B, and 20C. The server 10 is also connected to the content database 30 and the action log information database 40. The configuration of the communication network N is not limited. For example, the communication network N may include the internet or an intranet.

The user terminal 20 is a computer used by a viewer of the content (that is, a user who uses the content). In the present embodiment, the user corresponds to a student who uses educational content. The user terminal 20 has a function of accessing the content provision system 1 (server 10) to receive and display content data. The type and configuration of the user terminal 20 are not limited. For example, the user terminals 20 could be configured with a mobile terminal such as a high-function mobile phone (smartphone), a tablet terminal, a wearable terminal (e.g., a head-mounted display (HMD), smart glasses, or the like), a laptop personal computer, or a mobile phone. Alternatively, the user terminal 20 could be configured with a stationary terminal such as a desktop personal computer. The user terminal 20 may be configured by a combination of two or more types of terminals exemplified above.

By operating the user terminal 20 to log into the content provision system 1, the user can use (view) the content. For example, a user can have various experiences in a virtual space expressed by content via his/her avatar. In this embodiment, it is assumed that the user of the content provision system 1 has already logged in.

The content database 30 is a non-transitory storage medium or storage device that stores generated content data. The content database 30 can be said to be a library of existing content. The content data is stored in the content database 30 by any computer such as the server 10 or another computer.

The content data is stored in the content database 30 in association with a content ID that uniquely identifies the content. In one example, the content data includes virtual space data, model data, and a scenario.

The virtual space data is electronic data representing a virtual space constituting the content. For example, the virtual space data may include information indicating the arrangement of individual virtual objects constituting the background, the position of the virtual camera, the position of a virtual light source, or the like.

The model data is electronic data used to define the specifications of virtual objects constituting the content. The specifications of virtual objects show rules or methods for controlling the virtual objects. For example, the specification of a virtual object includes at least one of a configuration (for example, a shape and a dimension), an action, and a sound of the virtual object. The data structure of the model data of the avatar is not limited and may be designed in any given way. For example, the model data may include information on a plurality of joints and a plurality of bones constituting the avatar, graphic data representing an appearance design of the avatar, an attribute of the avatar, and an avatar ID serving as an identifier of the avatar. Examples of the information on joints and bones include three-dimensional coordinates of individual joints and combinations of adjacent joints (i.e., bones). However, the configuration of the information is not limited to this, and may be designed in any given way. The attribute of the avatar may be any piece of information that characterizes the avatar, and may include, for example, nominal dimensions, voice quality, or personality.

The scenario is electronic data that defines the motion of individual virtual objects, virtual cameras, or virtual light sources over time in a virtual space. The scenario can be said to be information for determining a story of the content. The action of the virtual object is not limited to movement that can be recognized visually, but may include generation of sound that can be recognized aurally. The scenario includes motion data indicating how and at what timing each virtual object operates.

The content data may include information about the real-world object. For example, the content data may include a photographed image of a real-world object. In a case where the content data includes a real-world object, the scenario may further specify where and when the real-world object is to be projected.

The action log information database 40 is a non-transitory storage medium or a storage device that stores action log information that records action details of an avatar operated by a user having viewed the content in the past during viewing of the content. Details of the action log information will be described later.

A position of installing each database is not limited. For example, at least one of the content database 30 or the action log information database 40 may be arranged in a computer system separate from the content provision system 1 or may be an element constituting the content provision system 1.

[Hardware Configuration of Content Provision System]

Figure 2:
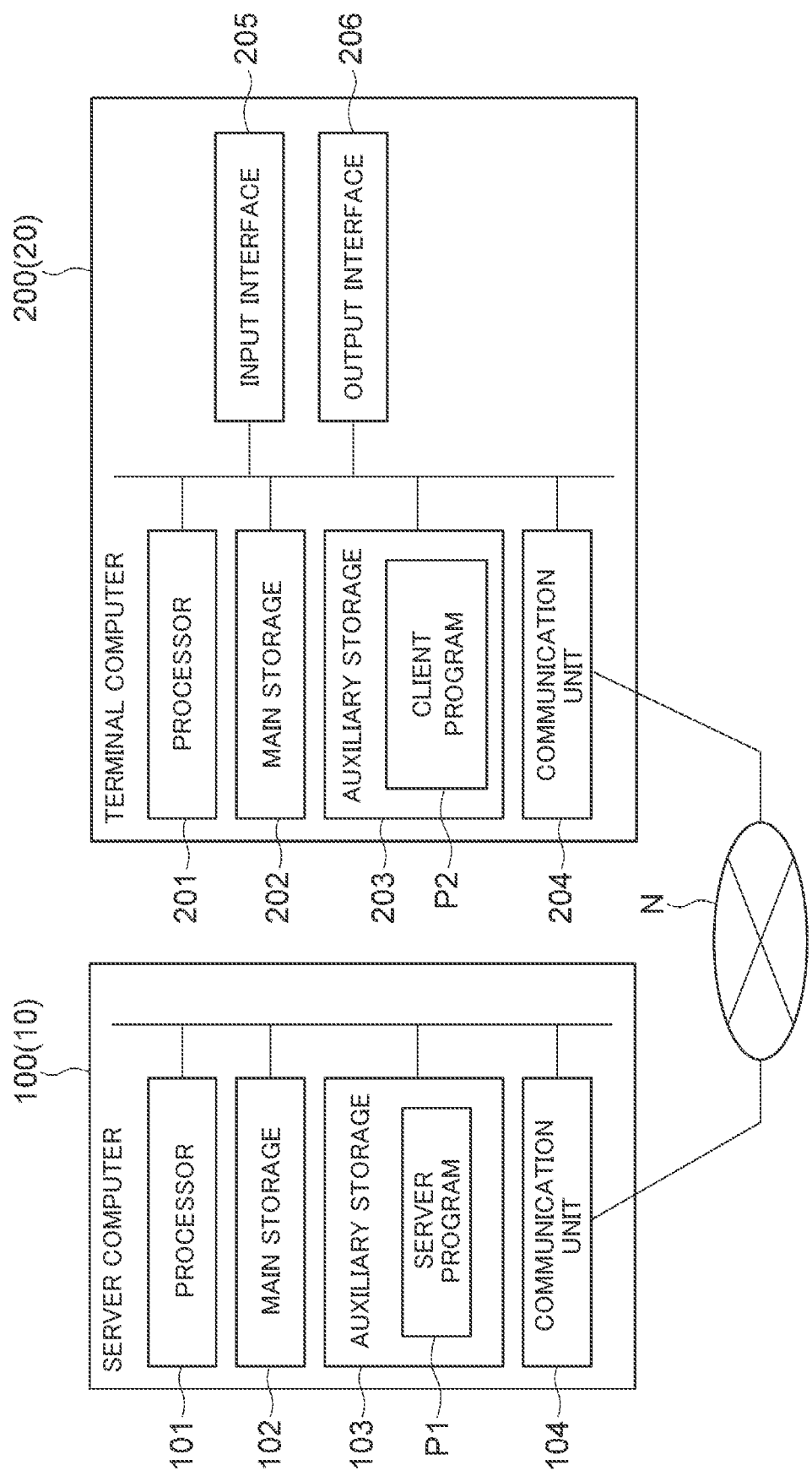
FIG. 2 is a diagram illustrating an exemplary hardware configuration related to the content provision system of FIG. 1.

FIG. 2 is a diagram illustrating an exemplary hardware configuration related to the content provision system 1. FIG. 2 shows a server computer 100 serving as the server 10, and a terminal computer 200 serving as the user terminal 20.

For example, the server computer 100 includes a processor 101, a main storage 102, an auxiliary storage 103, and a communication unit 104 as hardware components.

The processor 101 is a computing device that executes an operating system and application programs. Examples of the processor include a central processing unit (CPU) and a graphics processing unit (GPU), but the type of the processor 101 is not limited to these. For example, the processor 101 may be a combination of sensors and a dedicated circuit. The dedicated circuit may be a programmable circuit such as a field-programmable gate array (FPGA) or another type of circuit.

The main storage 102 is a device that stores a program for achieving the server 10 and computation results output from the processor 101, and the like. The main storage 102 is configured by, for example, a read only memory (ROM) or random access memory (RAM).

The auxiliary storage 103 is generally a device capable of storing a larger amount of data than the main storage 102. The auxiliary storage 103 is configured by, for example, a non-volatile storage medium such as a hard disk or a flash memory. The auxiliary storage 103 stores a server program P1 that causes the server computer 100 to function as the server 10 and stores various types of information. For example, the auxiliary storage 103 may store data related to at least one of the virtual object (e.g., the avatar) or the virtual space. In the present embodiment, a content provision program is implemented as a server program P1.

The communication unit 104 is a device that executes data communication with another computer via the communication network N. The communication unit 104 is, for example, a network card or a wireless communication module.

Each functional element of the server 10 is realized by having the processor 101 or the main storage 102 read the server program P1 and having the processor 101 execute the server program P1. The server program P1 includes codes that achieve the functional elements of the server 10. The processor 101 operates the communication unit 104 according to the server program P1, and executes reading and writing from and to the main storage 102 or the auxiliary storage 103. Through such processing, each functional element of the server 10 is achieved.

The server 10 may be constituted by one or more computers. In a case of using a plurality of computers, the computers are connected to each other via a communication network, so as to configure a logically single server 10.

As an example, the terminal computer 200 includes, as hardware components, a processor 201, a main storage 202, an auxiliary storage 203, a communication unit 204, an input interface 205, and an output interface 206.

The processor 201 is a computing device that executes an operating system and application programs. The processor 201 may be, for example, a CPU or a GPU, but the type of the processor 201 is not limited to these.

The main storage 202 is a device configured to store therein programs for realizing the user terminal 20, and computation results output from the processor 201, or other data. The main storage 202 is configured by, for example, a ROM or a RAM.

The auxiliary storage 203 is generally a device capable of storing a larger amount of data than the main storage 202. The auxiliary storage 203 is configured by, for example, a non-volatile storage medium such as a hard disk or a flash memory. The auxiliary storage 203 stores a client program P2 for causing the terminal computer 200 to function as the user terminal 20, and various data. For example, the auxiliary storage 203 may store data related to at least one of a virtual object such as an avatar or a virtual space. The content provision program could be implemented as a client program P2.

The communication unit 204 is a device that executes data communication with another computer via the communication network N. The communication unit 204 is configured by, for example, a network card or a wireless communication module.

The input interface 205 is a device that receives data based on a user's operation or action. For example, the input interface 205 includes at least one of a controller, a keyboard, an operation button, a pointing device, a microphone, a sensor, or a camera. The keyboard and the operation button may be displayed on the touch panel. The type of the input interface 205 is not limited, and neither is data input to the input interface 205. For example, the input interface 205 may receive data input or selected by a keyboard, an operation button, or a pointing device. Alternatively, the input interface 205 may receive audio data input through a microphone. Alternatively, the input interface 205 may receive image data (for example, video data or still image data) taken by a camera. Alternatively, the input interface 205 may receive, as motion data, data representing a user's non-verbal activity (e.g., line of sight, motion of the head or other part of the user's body such as a hand or the like (i.e., gesture), facial expression, or the like) detected by a motion capture function using a sensor or a camera.

The output interface 206 is a device that outputs data processed by the terminal computer 200. For example, the output interface 206 is configured by at least one of a monitor, a touch panel, an HMD, or a speaker. A display device such as a monitor, a touch panel, or an HMD displays processed data on a screen. In the present embodiment, the content image is output and displayed on the HMD. The speaker outputs a sound represented by the processed audio data.

Each functional element of the user terminal 20 is achieved by having the processor 201 or the main storage 202 read the client program P2 and execute the client program P2. The client program P2 includes code for achieving each functional element of the user terminal 20. The processor 201 operates the communication unit 204, the input interface 205, or the output interface 206 in accordance with the client program P2 to read and write information from and to the main storage 202 or the auxiliary storage 203. Through this processing, each functional element of the user terminal 20 is achieved.

At least one of the server program P1 or the client program P2 may be provided after being fixedly recorded on a tangible recording medium such as a CD-ROM, a DVD-ROM, or a semiconductor memory. Alternatively, at least one of these programs may be provided via a communication network as a data signal superimposed on a carrier wave. These programs may be separately provided or may be provided together.

[Function Details of Content Provision System]

The content provision system 1 is mainly configured to execute the avatar record process and the avatar reproduction process.

The avatar record process is a process of recording actions of a first avatar operated by a first user, while the first user views the content.

The avatar reproduction process is a process such that, when a second user views the content after the avatar record process is performed for at least one first user, the content is reproduced in the content image provided to the second user, along with the actions of the first avatar corresponding to the at least one first user recorded through the avatar record process.

The avatar record process and the avatar reproduction process are described step by step hereinbelow. In the present embodiment, the avatar is a human-shaped object (see FIG. 10 and FIG. 11), but the form of the avatar is not limited to a specific form.

[Functional Configuration Related to Avatar Record Process]

Figure 3:
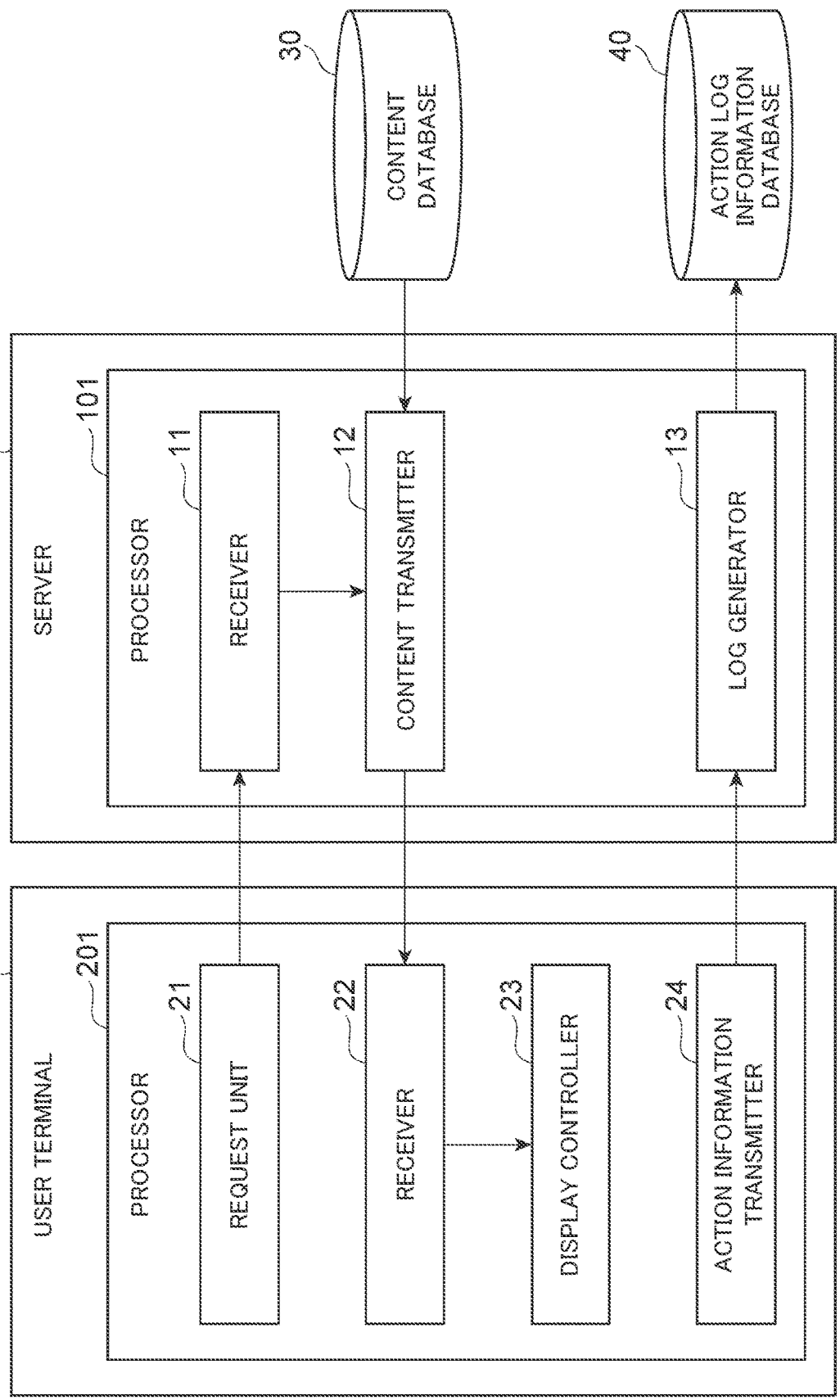
FIG. 3 is a diagram illustrating an exemplary functional configuration related to an avatar record process of the content provision system of FIG. 1.

FIG. 3 is a diagram illustrating an exemplary functional configuration related to the avatar record process of the content provision system 1. The following description deals with an example of recording an action of a first avatar corresponding to a first user using the user terminal 20A.

The server 10 includes a receiver 11, a content transmitter 12, and a log generator 13 as functional elements related to avatar record process. The receiver 11 receives a data signal transmitted from the user terminal 20. The content transmitter 12 transmits content data to the user terminal 20 in response to a request from the user. The log generator 13 generates action log information of the avatar based on action information of the avatar obtained from the user terminal 20, and stores the action log information in the action log information database 40.

The user terminal 20A includes a request unit 21, a receiver 22, a display controller 23, and an action information transmitter 24 as functional elements related to the avatar record process. The request unit 21 requests the server 10 to perform various types of control related to content. The receiver 22 receives content data. The display controller 23 processes the content data received and displays content on the display device of the user terminal 20A. The action information transmitter 24 transmits, to the server 10, action information indicating an action of the first avatar operated by the first user.

[Operation of System Related to Avatar Record Process]

Figure 4:
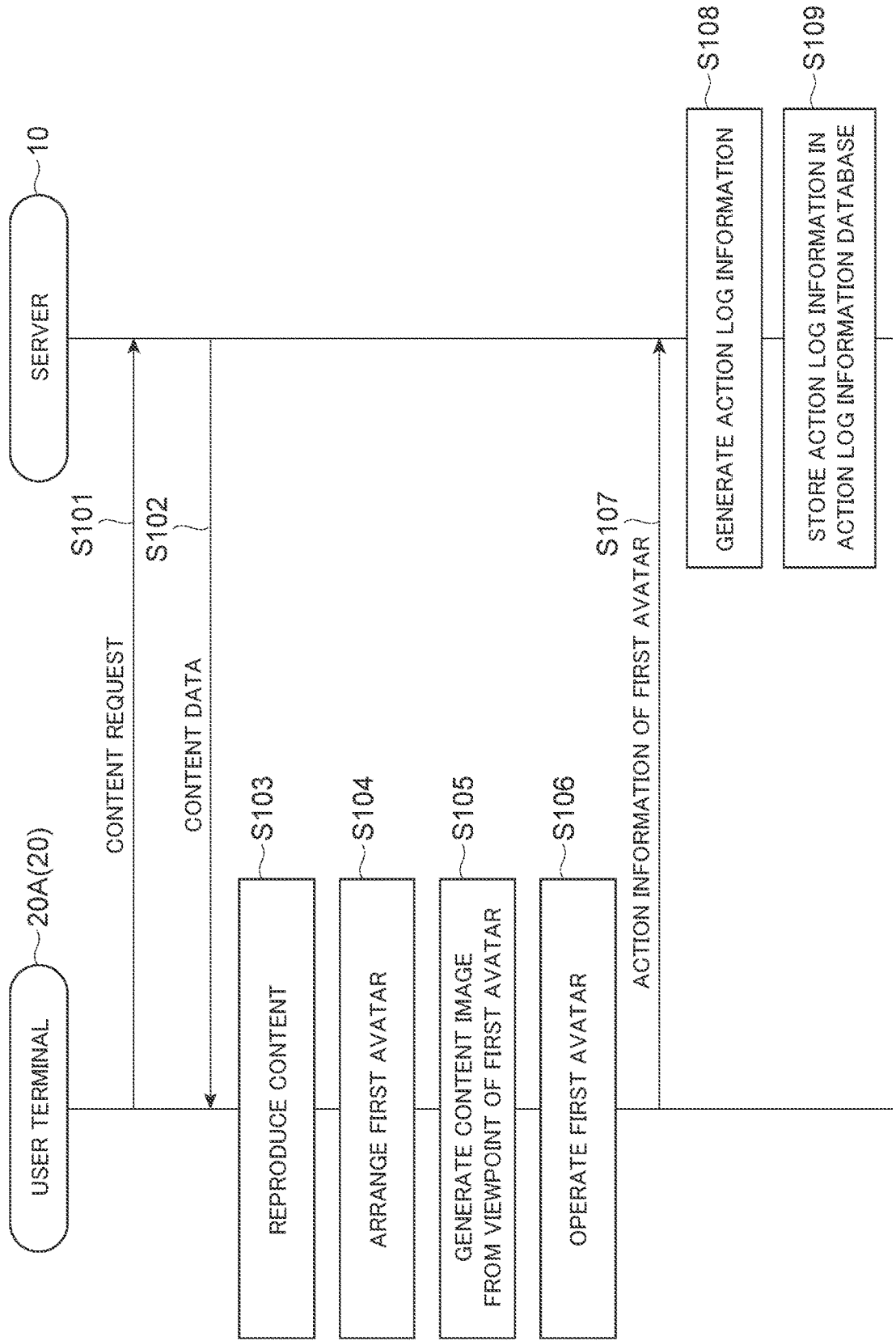
FIG. 4 is a sequence diagram illustrating an exemplary operation of the avatar record process of the content provision system of FIG. 1.

With reference to FIG. 4, the following describes an operation of the content provision system 1 related to the avatar record process, as well as a part of a content provision method according to the present embodiment. FIG. 4 is a sequence diagram showing an exemplary operation of the content provision system 1 related to the avatar record process.

In step S101, the request unit 21 of the user terminal 20A transmits a content request to the server 10. The content request is a data signal for requesting the server 10 to reproduce content (i.e., start viewing of content). The content request is received by the receiver 11 of the server 10.

In step S102, the content transmitter 12 of the server 10 retrieves content data from the content database 30 in response to the content request from the user terminal 20A, and transmits the content data to the user terminal 20A. The content data is received by the receiver 22 of the user terminal 20A.

In step S103, the display controller 23 of the user terminal 20A reproduces the content. In the present embodiment, the content distributed by the content provision system 1 is educational content showing a scene of a lesson. As an example, the content includes lecture data representing a video of a scene in which a teacher is giving a lecture. The lecture data is, for example, three-dimensional (with depth) video data. As an example, the virtual space represented by the content includes a background such as a classroom of a school and an area to display lecture data (video) at a predetermined position of the virtual space. In the present embodiment, reproduction of content refers to reproduction of the lecture data in the virtual space.

In step S104, the display controller 23 arranges the first avatar corresponding to the first user in the virtual space. For example, in the virtual space simulating a classroom, the display controller 23 arranges the first avatar at a position in front of the display area of the lecture data (i.e., a position where the lecture data is visually recognizable).

In step S105, the display controller 23 generates a content image (content video) to be presented to the first user based on the viewpoint of the first avatar arranged in the virtual space (i.e., a virtual viewpoint of the first user set in the virtual space). Note that, while the present embodiment deals with a case where the user terminal 20A (the display controller 23) performs a process (rendering) of generating a content image for the first user based on the content data and the virtual viewpoint of the first user, it may be the server 10 that performs the rendering.

Figure 5:
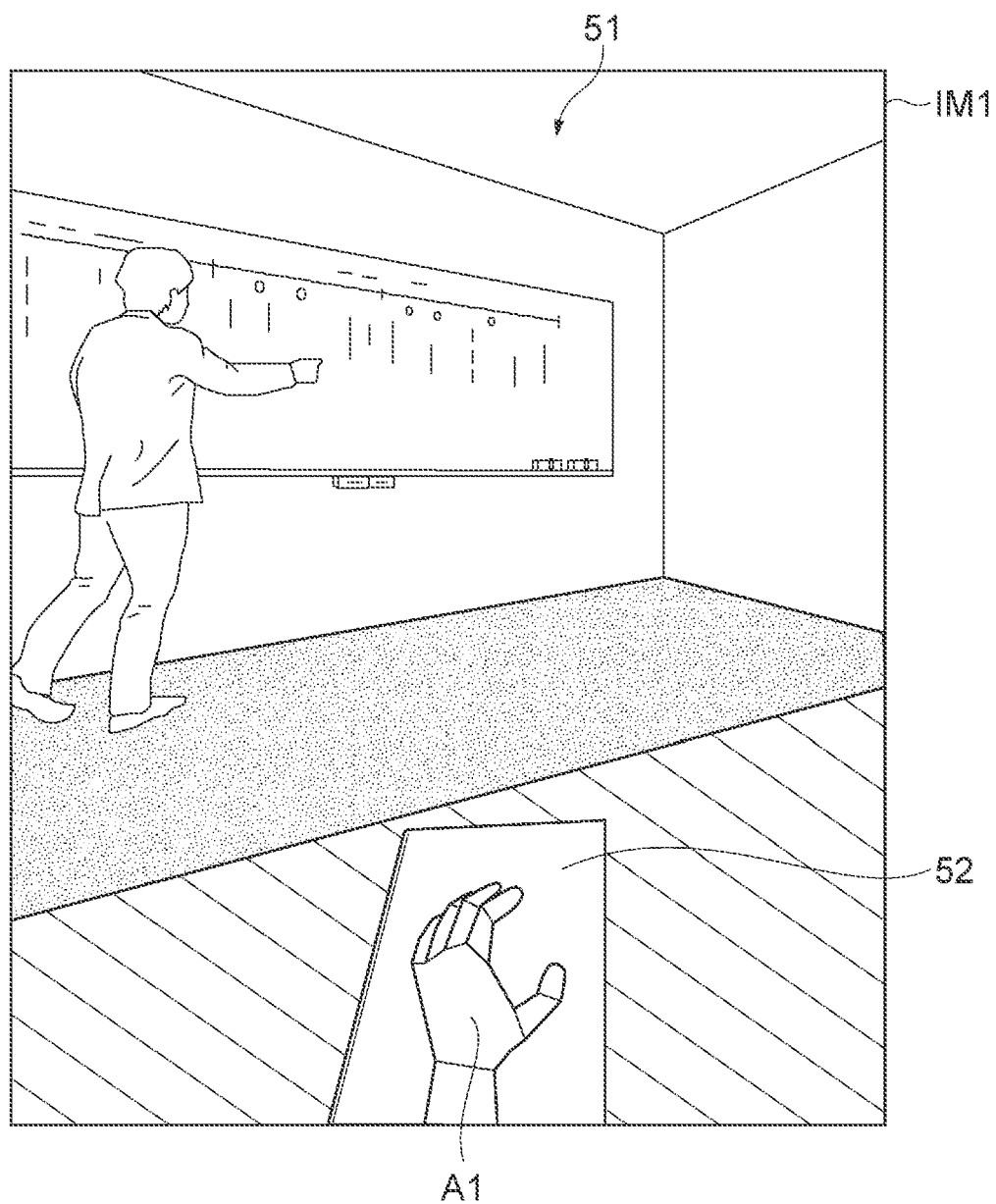
FIG. 5 is a diagram showing an exemplary content image provided to a first user.

FIG. 5 is a diagram showing an exemplary content image IM1 provided to a first user. In the example of FIG. 5, the content image IM1 includes a part of an area 51 where the lecture data (video) is displayed (i.e., a range within the field of view of the first user from the virtual viewpoint). The content image IM1 includes a part (a hand part) of the first avatar A1 operated by the first user and a tool object 52 (e.g., an object simulating a book) operable via the first avatar A1.

In step S106, the first user operates the user terminal 20A to operate the first avatar A1. The way the first user operates the first avatar A1 is not limited to a specific method. For example, the first user may operate the first avatar A1 by operating a controller (e.g., input interface 205) of the user terminal 20A. Alternatively, in a case where, for example, the user terminal 20A includes a sensor such as an accelerometer or a gyrosensor attachable to a hand of the first user (an example of the input interface 205), the first user may operate the first avatar A1 by making a gesture (i.e., by a motion of the user's hand detected by the sensor).

An exemplary possible operation regarding the avatar is an operation of moving a hand part of the avatar in the virtual space, an operation of executing some sort of processing to a predetermined object in the virtual space, via the hand part of the avatar, and the like. Note that the operable part of the avatar is not limited to the hand part of the avatar. For example, in a case where a sensor is provided to a plurality of parts of the user's body and a motion of each part is sensible, a plurality of parts of the avatar (i.e., parts corresponding to the parts of the user's body with sensors) may be moved in response to the motion of the user's body.

In step S107, the action information transmitter 24 of the user terminal 20A transmits, to the server 10, action information indicating an action of the first avatar A1 operated in step S106. The action information is associated with a reproduction position of the content (lecture data) (e.g., a reproduction time, where a leading time point of the lecture data is set as the reference "0:00"). For example, the action information of the first avatar A1 is information recording the state of the first avatar A1 (e.g., positional coordinates of each part constituting the first avatar A1) at each time point that is obtained by dividing a period from the reproduction start time till the reproduction end time of the content. That is, the action information of the first avatar A1 is information for reproducing the motion of the first avatar A1 from the reproduction start time to the reproduction end time of the content.

In step S108, the log generator 13 of the server 10 generates the action log information of the first avatar A1 based on the action information of the first avatar A1 received from the user terminal 20A (from the action information transmitter 24). The action log information includes, along with the action information of the first avatar A1, specific action information indicating the timing at which the first avatar A1 performed a predetermined specific action and the detail of that specific action. For example, the log generator 13 extracts the specific action from the action information of the first avatar A1, and generates specific action information for each specific action extracted. Then, the log generator 13 generates the action log information including the action information of the first avatar A1 and the specific action information of each specific action extracted.

An example of the specific action includes an action of selecting a predetermined item object out of one or more item objects registered in advance as items to be used for learning a lesson and generating the predetermined item object selected in the virtual space. A specific example of such a specific action is described with reference to FIG. 5 to FIG. 7.

Figure 6:
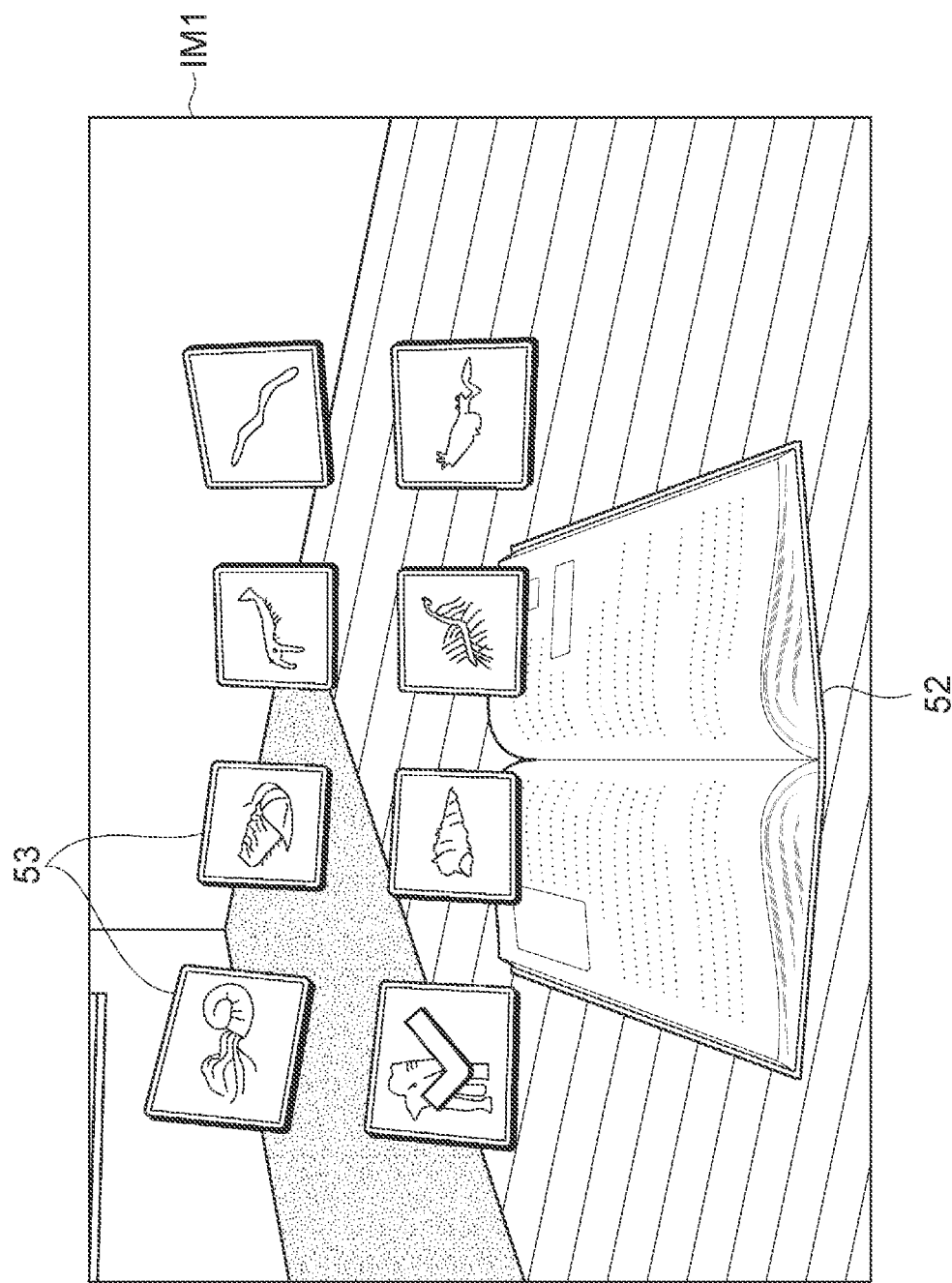
FIG. 6 is a diagram showing an exemplary specific action of an avatar.
Figure 7:
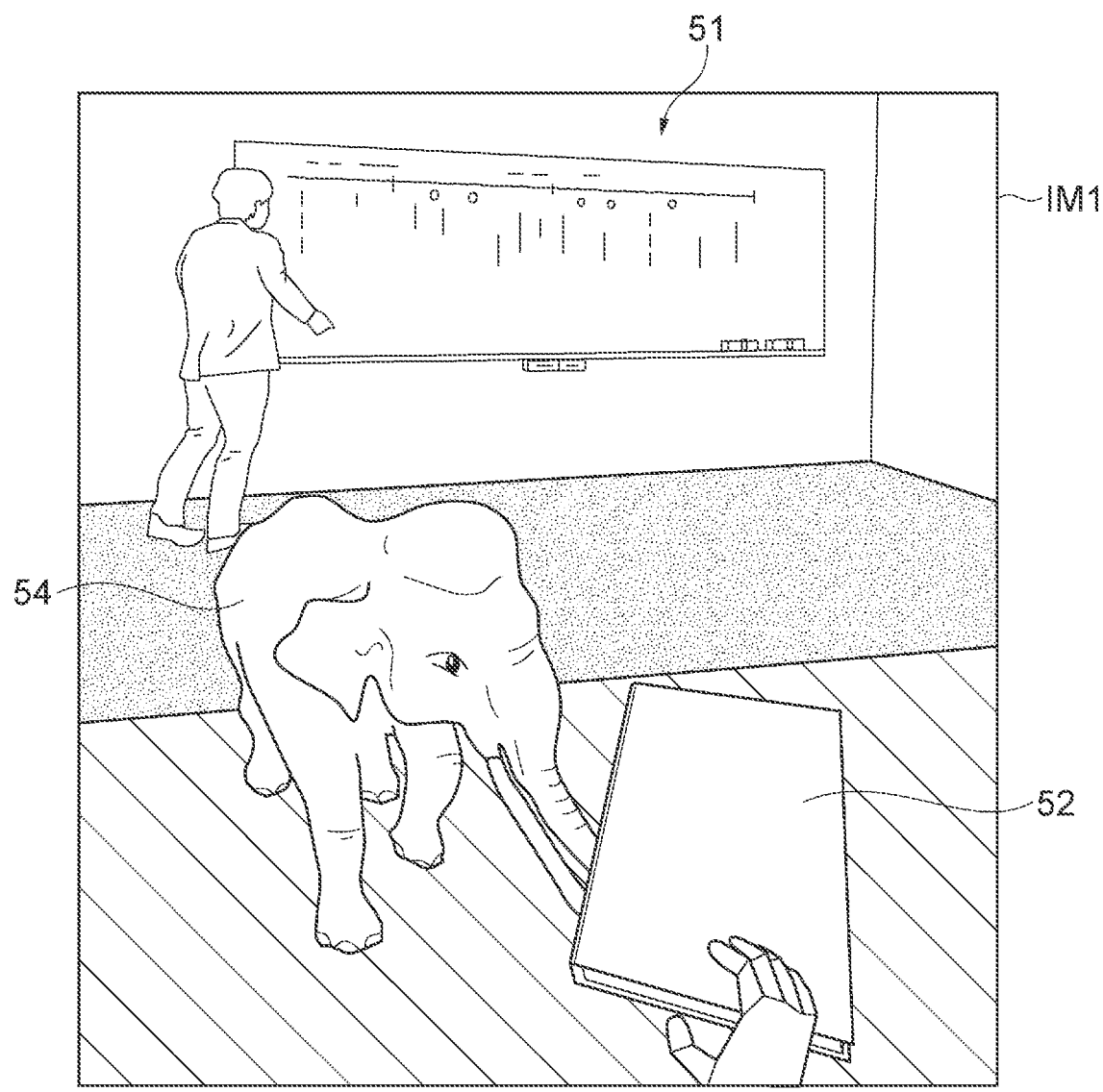
FIG. 7 is a diagram showing an exemplary specific action of the avatar.

First, the first user positions a hand of the first avatar A1 to the tool object 52 and executes an operation to select the tool object 52, while confirming the content image IM1, as shown in FIG. 5. Through this operation, a list of one or more item objects 53 (eight objects in this example) registered in advance as the items for use in learning the lesson is displayed as shown in FIG. 6. In the example of FIG. 6, models of ancient living organisms such as a mammoth, an ammonite, or a Pikaia are registered as the item objects 53. For example, the first user positions the hand of the first avatar A1 to any of the item objects 53 the first user wishes to select, and performs an operation to select that item object 53. In this way, the selected item object 53 (a mammoth model in this example) is generated in front of the eyes of the first avatar A1, as shown in FIG. 7. For example, the first user is able to freely move the item object 53 via the first avatar A1 and observe the item object 53 from various angles. Note that the type of the item objects 53 is not limited to the above examples. Various types of item objects 53 may be used depending on what is taught in the lesson. For example, when the content (lecture data) shows a scene of a science class (biology), experimental tools such as a beaker, a flask, and a microscope may be registered as the item objects 53. Further, when the content indicates a scene of a mathematics class, a ruler, a protractor, a compass, or the like may be registered as the item object 53.

In the present embodiment, when the above-described specific action (i.e., the action of selecting the tool object 52 and selecting a predetermined item object 53) is extracted from the action information of the first avatar A1, the log generator 13 generates specific action information in which the timing of performing the specific action (e.g., the reproduction position of the content when the specific action is performed) is associated with the detail of that specific action (information indicating the item object 53 selected).

In step S109, the log generator 13 stores the action log information generated in step S107 in the action log information database 40.

Through the above-described process, the process of storing the action log information of the first avatar operated by the first user while the first user views the content (i.e., avatar record process) is completed. Note that such an avatar record process is executed at any given timing for each of a plurality of first users viewing the content. In this way, action log information is stored for each of a plurality of first avatars in the action log information database 40.

[Functional Configuration Related to Avatar Reproduction Process]

Figure 8:
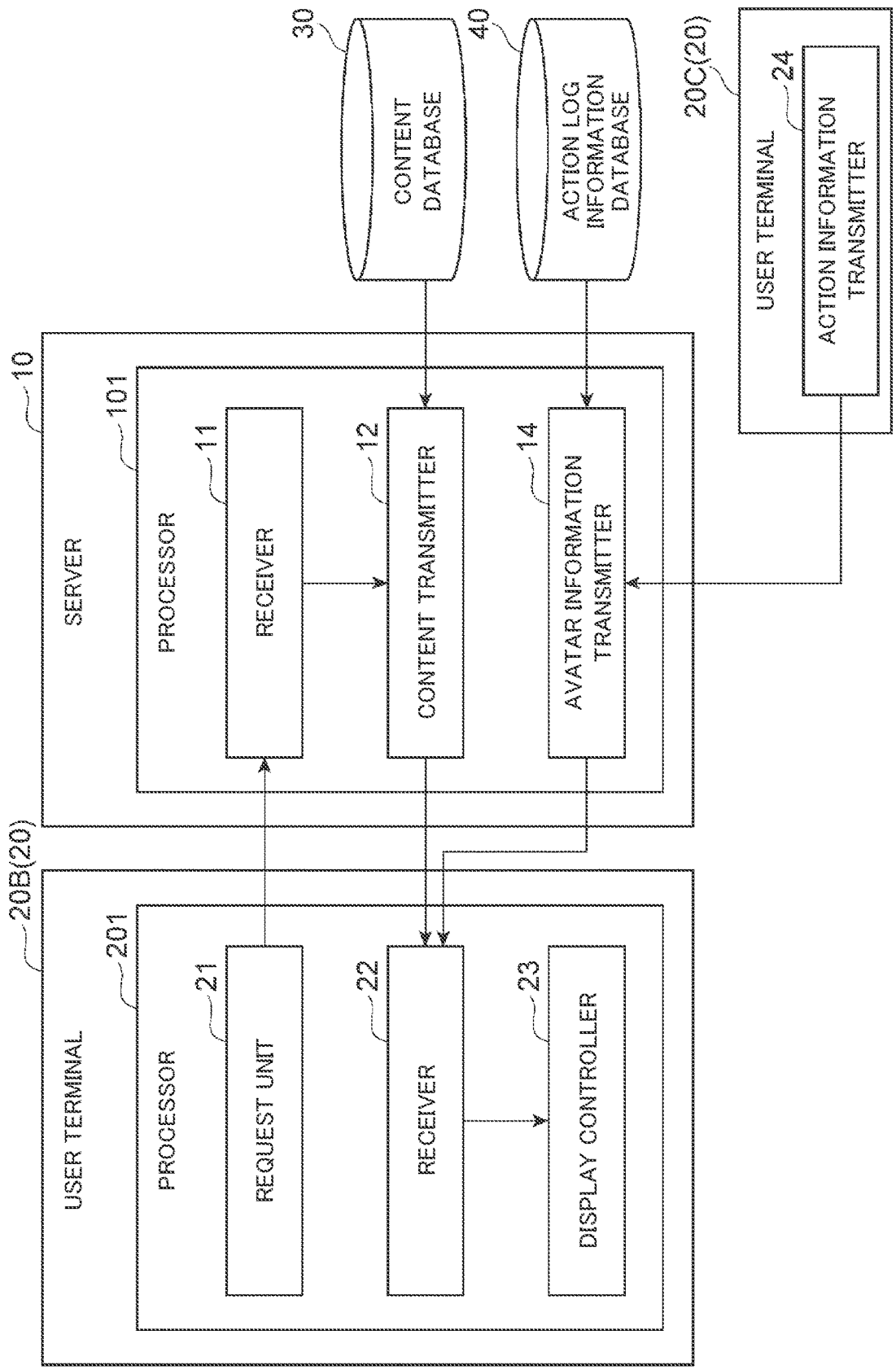
FIG. 8 is a diagram illustrating an exemplary functional configuration related to an avatar reproduction process of the content provision system of FIG. 1.

FIG. 8 is a diagram illustrating an exemplary functional configuration related to the avatar reproduction process of the content provision system 1. The following example assumes that a second user using the user terminal 20B views the content, after the action log information is stored for one or more first avatars through the above-described avatar record process (i.e., after one or more first users viewed the content).

In addition to the above-described receiver 11 and the content transmitter 12, the server 10 includes an avatar information transmitter 14 as a functional element related to the avatar reproduction process. The avatar information transmitter 14 transmits, to the user terminal 20, the action log information of one or more first users having viewed the content in the past. Further, if there is a third user viewing the content at the same time as the second user, the avatar information transmitter 14 also transmits, to the user terminal 20, the action information of a third avatar corresponding to the third user. The present embodiment assumes that the third user using the user terminal 20C is viewing the content at the same time as the second user. In this case, the avatar information transmitter 14 transmits the action information of the third avatar received from the user terminal 20C to the user terminal 20B. In practice, the action log information of the first user and the action information of the avatar of the second user (second avatar) are transmitted to the third user (user terminal 20C), similarly to the processing taking place for the second user (user terminal 20B). The following description, however, will focus on the processing taking place for the second user (user terminal 20B).

The user terminal 20B includes a request unit 21, a receiver 22, and a display controller 23 as functional elements related to the avatar reproduction process. The request unit 21 and the receiver 22 have the same function as those for the avatar record process. The display controller 23 executes a process specific to the avatar reproduction process in addition to the processes described in relation to the avatar record process.

[Operation of System Related to Avatar Reproduction Process]

Figure 9:
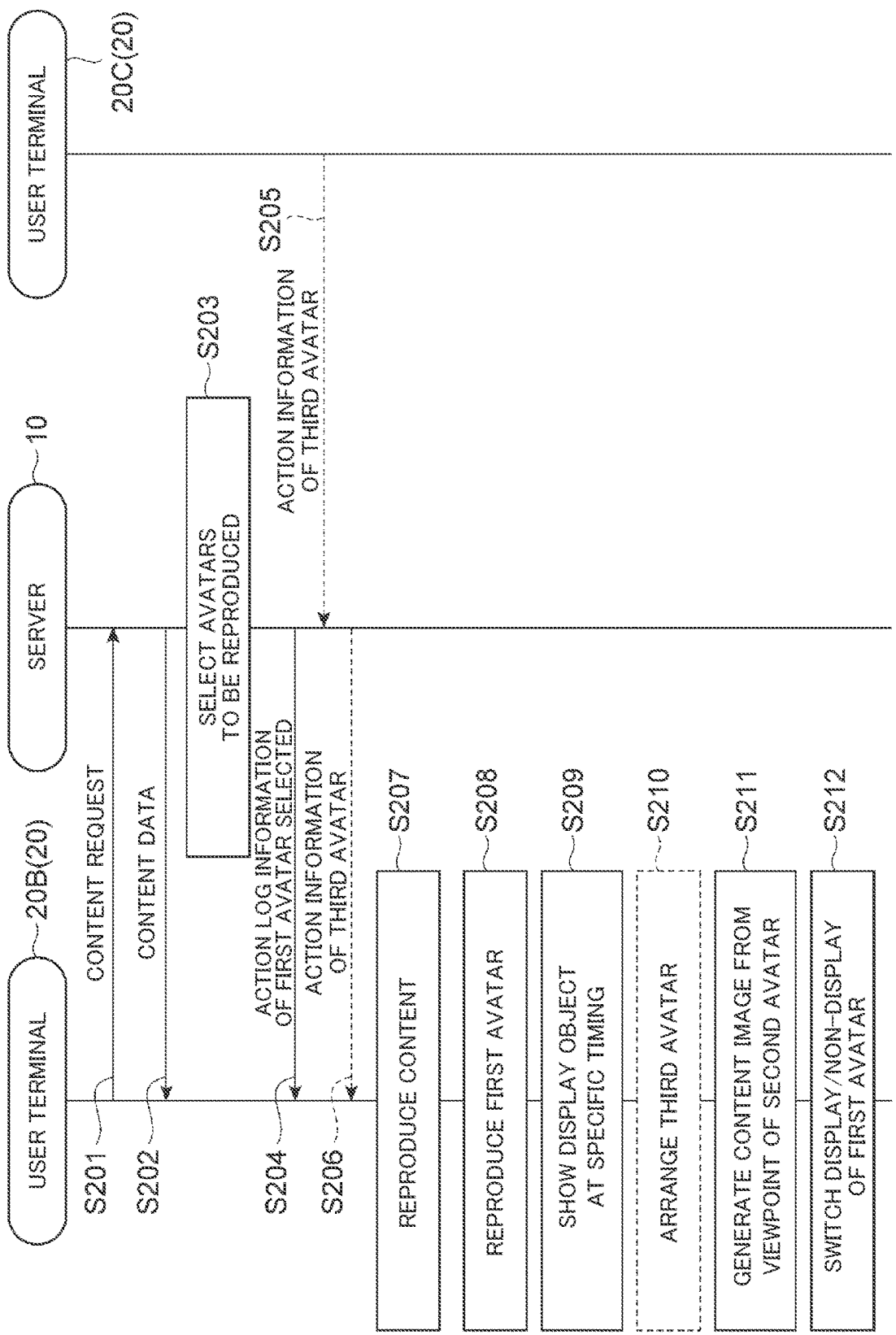
FIG. 9 is a sequence diagram illustrating an exemplary operation of the avatar reproduction process of the content provision system of FIG. 1.

With reference to FIG. 9, the following describes an operation of the content provision system 1 related to the avatar reproduction process, as well as a part of the content provision method according to the present embodiment. FIG. 9 is a sequence diagram showing an exemplary operation of the content provision system 1 related to the avatar reproduction process.

In step S201, the request unit 21 of the user terminal 20B transmits a content request to the server 10. The content request is a data signal for requesting the server 10 to reproduce content (i.e., start viewing of content). The content request is received by the receiver 11 of the server 10.

In step S202, the content transmitter 12 of the server 10 retrieves content data from the content database 30 in response to the content request from the user terminal 20B, and transmits the content data to the user terminal 20B. The content data is received by the receiver 22 of the user terminal 20A.

In step S203, the avatar information transmitter 14 of the server 10 selects an avatar to be reproduced. For example, assume that there are a plurality of first users having viewed in the past the content identical to the content the second user is intended to view, and that the action log information database 40 stores the action log information of the plurality of first avatars. If all the first avatars are reproduced (displayed) in the content (virtual space) provided to the second user, there will be a large number of first avatars in the content image provided to the second user. This may cause information displayed in a content image to become cluttered. To avoid this, the avatar information transmitter 14 selects, as reproduction targets, the predetermined number (e.g., 3) of first avatars out of the plurality of first avatars for which action log information is stored in the action log information database 40.

For example, the avatar information transmitter 14 may select the predetermined number of first avatars by prioritizing the first avatars having more recently generated action log information than the others (i.e., the first avatars of the first users having more recently viewed the content). Alternatively, the avatar information transmitter 14 may select the predetermined number of first avatars by prioritizing the first avatars having the higher number of recorded pieces of the specific action information in the action log information (i.e., the first avatars having performed the specific action the largest number of times during viewing of the content).

In step S204, the avatar information transmitter 14 transmits, to the user terminal 20B, pieces of the action log information of the predetermined number of first avatars selected in step S203.

If there is a third user viewing the content at the same time as the second user, steps S205 and S206 are executed. That is, in step S205, the server 10 (the avatar information transmitter 14 for example) retrieves the action information of the third avatar corresponding to the third user from the user terminal 20C. In step S206, the server 10 (the avatar information transmitter 14, for example) transmits the action information of the third avatar to the user terminal 20B.

In step S207, the display controller 23 of the user terminal 20B reproduces the content. The process of step S207 is the same as the process of step S103.

In step S208, the display controller 23 reproduces the action of each of the first avatars in the virtual space based on the action information in the action log information of each of the first avatars received in step S204. That is, the display controller 23 arranges each first avatar in the virtual space, and moves the first avatar based on the action information in the action log information corresponding to the first avatar. Here, each first avatar may be arranged in the position the first avatar is actually arranged in the past. However, this may cause an interference between first avatars or between a first avatar and the second avatar (the avatars may be arranged so as to overlap with one another in the same position). In view of this, the display controller 23 may arrange each first avatar in a position different from the position the first avatar has been arranged in the past so that the avatars do not interfere with each other (e.g., the avatars are spaced from one another at a certain interval).

In step S209, the display controller 23 refers to the specific action information contained in the action log information of each first avatar received in step S204 and thereby arranges a display object indicating the detail of the specific action in association with the first avatar at a timing when each first avatar being reproduced performs the specific action. For example, suppose that a first user having viewed content in the past operated his/her first avatar to cause the first avatar to perform a specific action at a reproduction position "30:00" of the content (i.e., 30 min. after reproduction has started). In this case, when the second user views the content, the display controller 23 arranges the display object indicating the detail of the specific action of the first avatar in association with the first avatar, upon reaching the same reproduction position of the content ("30:00" in this case).

If there is a third user viewing the same content as the second user (i.e., the action information of the third avatar is received in step S206), the display controller 23 in step S210 arranges the third avatar in the virtual space and moves the third avatar based on the action information of the third avatar. The action information of the third avatar is periodically transmitted from the user terminal 20C to the user terminal 20B at predetermined intervals via the server 10.

In step S211, the display controller 23 generates a content image (content video) to be presented to the second user based on the viewpoint of the second avatar corresponding to the second user, in the virtual space (i.e., a virtual viewpoint of the second user set in the virtual space). Note that, while the present embodiment deals with a case where the user terminal 20B (the display controller 23) performs a process (rendering) of generating a content image for the second user based on the content data and the virtual viewpoint of the second user, it may be the server 10 that performs the rendering.

In step S212, the display controller 23 may switch display and non-display of the first avatar while the second user is viewing the content, based on an instruction operation from the second user. For example, when an instruction of switching to the non-display of the first avatar is received through a user operation on the controller of the user terminal 20B, the display controller 23 may perform switching so that the first avatar being reproduced does not appear in the content image. Further, when an instruction of again displaying the first avatar that has been switched to the non-display state is received, the display controller 23 may perform switching so the first avatar appears in the content image. Note that, in a case where a plurality of first avatars are selected as the reproduction target, the display/non-display of the first avatars may be switchable individually for each of the first avatars, or switchable collectively at once for all of the first avatars.

Figure 10:
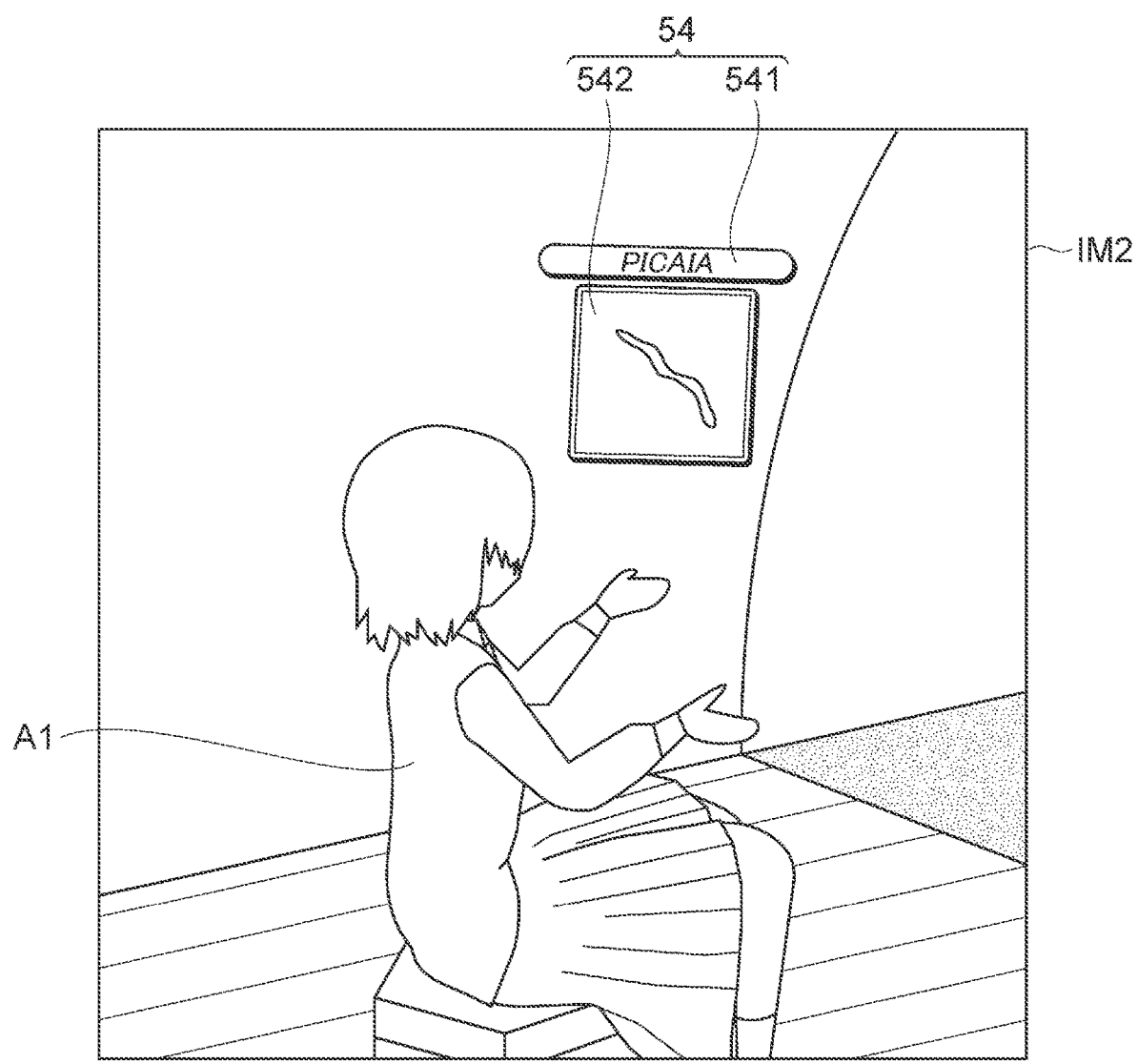
FIG. 10 is a diagram illustrating an exemplary display object displayed in a content image.

FIG. 10 is a diagram illustrating an exemplary display object 54 displayed in a content image IM2 provided to the second user. In this example, the display object 54 indicating the detail of the specific action of the first avatar A1 selecting and generating in the virtual space the item object 53 that shows the model of a Pikaia is arranged in association with the first avatar A1. As an example, the display object 54 is arranged near the first avatar A1 (in a space in front of the head of the first avatar A1 in this example). As shown in FIG. 10, the display object 54 may include text information 541 indicating the selected item object 53 and an illustration image 542 indicating the selected item object 53. Note that a real image such as a photograph may be used instead of the illustration image 542. Simply reproducing the first avatar A1 based on the action information of the first avatar A1 (i.e., only reproducing the movement of the hand of the first avatar A1) does not enable grasping exactly what kind of action the first avatar A1 took while viewing the content. In other words, it is not possible to grasp which item object 53 was selected by operation of the tool object 52 (see FIG. 5) via the first avatar A1. On the other hand, by arranging the display object 54 indicating the detail of the specific action at the timing the first avatar A1 performs that specific action (an operation of selecting a predetermined item object 53 in the present embodiment) in association with the first avatar A1 as described above, the second user is able to visually grasp the specific action performed by the first user (first avatar A1) at a suitable timing.

Figure 11:
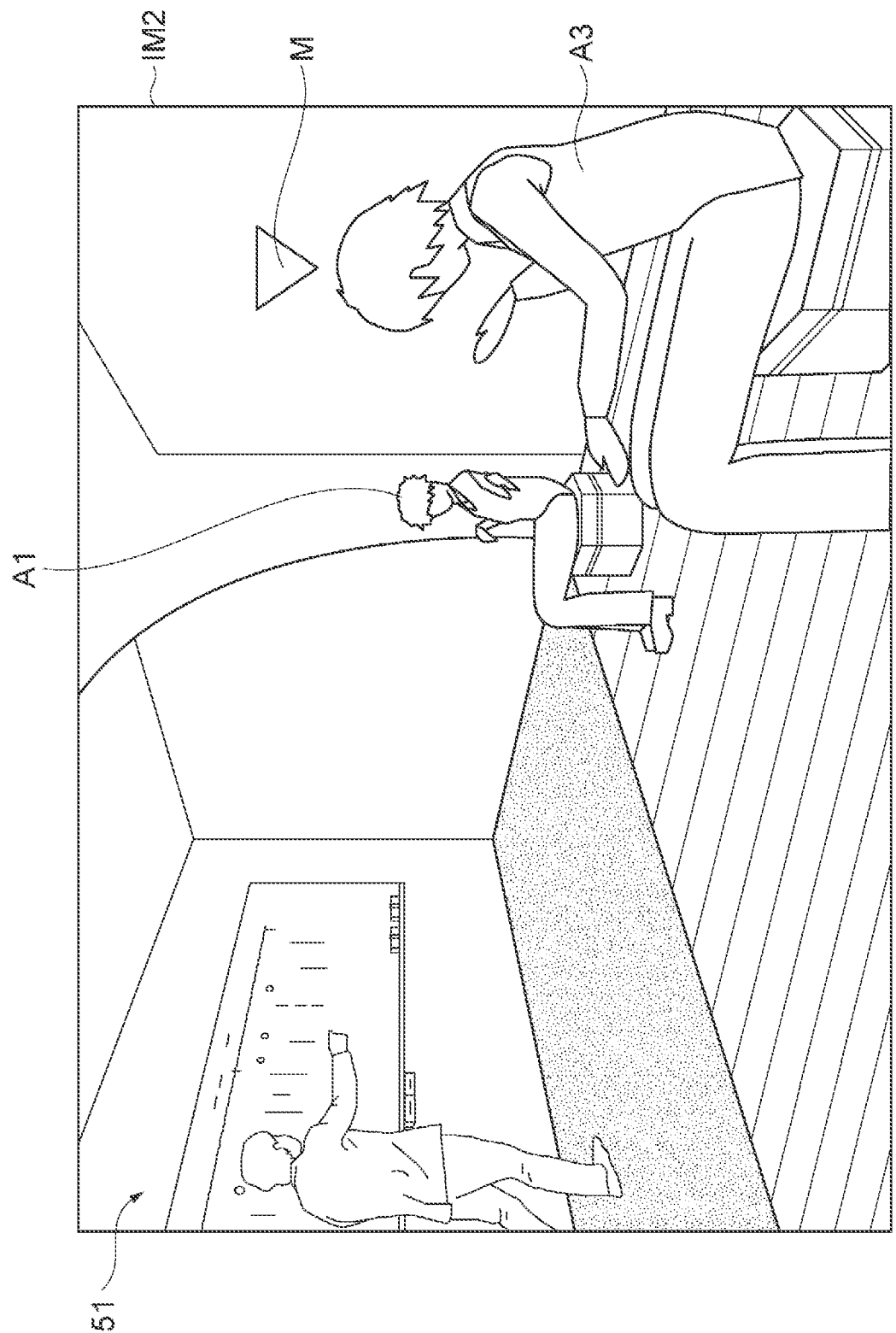
FIG. 11 is a diagram illustrating an exemplary display of the first avatar and a third avatar in a content image.

FIG. 11 is a diagram illustrating an exemplary display of the first avatar A1 and a third avatar A3 in a content image IM2. As shown in FIG. 11, the display controller 23 may display the third avatar A3 corresponding to the third user who is viewing the content at the same time as the second user in a display mode different from that of the first avatar A1 corresponding to the first user having viewed the content in the past (i.e., the avatar being reproduced based on the action log information). In the example of FIG. 11, the display controller 23 arranges an inverted-triangular mark object M in a space above the third avatar A3. The presence or absence of such a mark object M enables the second user to accurately know whether each avatar placed in the virtual space is the first avatar A1 being reproduced or the third avatar A3 corresponding to the third user who is viewing the content in real time. Note that the display mode for distinguishing the third avatar A3 from the first avatar A1 is not limited to the example shown in FIG. 11. For example, the display controller 23 may display the third avatar A3 in a color different from that of the first avatar A1 (e.g., in a bright color) or may display the first avatar A1 in a translucent manner.

[Advantages]

As described above, a content provision system according to an aspect of the present disclosure includes at least one processor. The at least one processor is configured to: arrange, in a virtual space, a first avatar corresponding to a first user viewing predetermined content representing the virtual space; generate action log information that records action information indicating an action of the first avatar operated by the first user while the first user views the content and specific action information indicating a timing of performance of a predetermined specific action by the first avatar and a detail of the specific action; reproduce the content along with an action of the first avatar based on the action information contained in the action log information, when the second user views the content after the first user viewed the content; and refer to the specific action information contained in the action log information and thereby arrange a display object that indicates the detail of the specific action in association with the first avatar at the timing of performance of the specific action by the first avatar being reproduced.

A content provision method related to one aspect of the present disclosure includes: arranging, in a virtual space, a first avatar corresponding to a first user viewing predetermined content representing the virtual space; generating action log information that records action information indicating an action of the first avatar operated by the first user while the first user views the content and specific action information indicating a timing of performance of a predetermined specific action by the first avatar and a detail of the specific action; reproducing the content along with an action of the first avatar based on the action information contained in the action log information, when the second user views the content after the first user viewed the content; and referring to the specific action information contained in the action log information and thereby arranging a display object that indicates the detail of the specific action in association with the first avatar at the timing of performance of the specific action by the first avatar being reproduced.

A content provision program related to one aspect of the present disclosure causes a computer to execute: arranging, in a virtual space, a first avatar corresponding to a first user viewing predetermined content representing the virtual space; generating action log information that records action information indicating an action of the first avatar operated by the first user while the first user views the content and specific action information indicating a timing of performance of a predetermined specific action by the first avatar and a detail of the specific action; reproducing the content along with an action of the first avatar based on the action information contained in the action log information, when the second user views the content after the first user viewed the content; and referring to the specific action information contained in the action log information and thereby arranging a display object that indicates the detail of the specific action in association with the first avatar at the timing of performance of the specific action by the first avatar being reproduced.

The above-described aspects bring about the following advantages. That is, for the second user viewing content after the first user having viewed the content in the past, an action of the first avatar A1 operated by the first user while the first user viewed the content is reproduced. This allows the second user to feel a sense of unity with the other user (the first user) while viewing the content. Furthermore, a display object 54 indicating a specific action performed by the first avatar A1 during content viewing is arranged in association with the first avatar A1 at the timing when that specific action was performed. In this way, the detail of the specific action performed by the first avatar A1 can be visually presented to the second user at a suitable timing, as reference information regarding an action that should be taken while viewing the content. As a result, it is possible to effectively improve the convenience of the user (second user) who views the content.

The content provision system related to another aspect may be such that the content is educational content showing a scene of a lesson; and the specific action is an action of selecting a predetermined item object out of one or more item objects registered in advance as items to be used for learning a lesson and generating the predetermined item object selected in the virtual space. According to the above configuration, the second user can generate an appropriate item object 53 in the virtual space by referring to the action of another user (first user) (i.e., a specific action of the first avatar A1) according to the progress of the lesson in the virtual space. This effectively improves the efficiency of learning by utilizing the virtual space.

In the content provision system related to another aspect may be such that the display object includes an illustration image indicating the item object. According to the above configuration, the detail of the item object 53 taken out by the first avatar A1 can be visually and easily grasped by the illustration image 542.

The content provision system related to another aspect may be such that, if there is a third user viewing the content at the same time as the second user, the at least one processor displays a third avatar corresponding to the third user in a different display mode from that of the first avatar while the second user views the content. The above-described configuration enables distinguishing the first avatar A1 of the first user having viewed the content in the past from the third avatar A3 of the third user viewing the content in real time at the same time as the second user. As a result, the second user is able to easily communicate with the third user viewing the content in real time.

The content provision system related to another aspect may be such that the at least one processor switches display and non-display of the first avatar based on an instruction operation from the second user, while the second user views the content. If too many first avatars A1 are displayed in the virtual space, the information displayed in the content image IM2 provided to the second user will become cluttered. The above-described configuration enables the second user to freely switch the first avatars to the non-display state.

The content provision system related to another aspect may be such that, if the action log information has been generated for a plurality of the first avatars corresponding to a plurality of the first users, the at least one processor selects the predetermined number of the first avatars as reproduction targets when the second user views the content. By limiting the number of first avatars A1 displayed in the virtual space to a certain number (predetermined number) or less, the above-described configuration avoids cluttering of information displayed in the content image IM2 provided to the second user.

The content provision system related to another aspect may be such that the at least one processor selects the predetermined number of the first avatars by prioritizing the first avatars having more recently generated action log information. It is considered that a user having viewed the content while seeing an action performed by another user (avatar) having viewed the content earlier is likely to have more suitably operated the avatar during the viewing of the content, as compared to the other user having viewed the content earlier. The above-described configuration preferentially displays, in the content image IM2 to be provided to the second user, the first avatars A1 of the first users viewed the content as recently as possible. In this way, it is possible to improve the quality of reference information (specific action of the first avatars A1) to be provided to the second user.

The content provision system related to another aspect may be such that the at least one processor selects the predetermined number of the first avatars by prioritizing the first avatars having the higher number of recorded pieces of the specific action information in the action log information. It is likely that a first user corresponding to a first avatar with the higher number of recorded pieces of specific action information has more actively engaged in learning during viewing of the content. By prioritizing selecting the first avatar A1 of such a user as the reproduction target, it is possible to increase the amount of reference information (specific actions of the first avatars A1) provided to the second user.

[Modifications]

The present disclosure has been described above in detail based on the embodiments. However, the present disclosure is not limited to the embodiments described above. The present disclosure may be changed in various ways without departing from the spirit and scope thereof.

For example, some of the functions of the server 10 described above may be executed by the user terminal 20. On the other hand, the above-described functions of the user terminal 20 may be partially executed in the server 10. For example, in the above-described embodiments, the display controller 23 of the user terminal 20 mainly executes reproduction of the content, reproduction of the avatars, and generation of the content image. These processes, however, may be executed in the server 10. In such a case, the user terminal 20 may simply receive a content image processed and generated in the server 10 from the server 10 and execute a display process of displaying the received content image on the display.

In the present disclosure, the expression "at least one processor executes a first process, a second process, and . . . executes an n-th process." or the expression corresponding thereto is a concept including the case where the execution bodies (i.e., processors) of the n processes from the first process to the n-th process change in the middle. In other words, this expression is a concept including both a case where all of the n processes are executed by the same processor and a case where the processor changes during the n processes, according to any given policy.

The processing procedure of the method executed by the at least one processor is not limited to the example of the above embodiments. For example, a part of the above-described steps (processing) may be omitted, or each step may be executed in another order. Any two or more of the above-described steps may be combined, or some of the steps may be modified or deleted. As an alternative, the method may include a step other than the steps, in addition to the steps described above.

DESCRIPTION OF REFERENCE CHARACTERS

1 Content Provision System
10 Server
11 Receiver
12 Content Transmitter
13 Log Generator
14 Avatar Information Transmitter
20, 20A, 20B, 20C User Terminal
21 Request Unit
22 Receiver
23 Display Controller
24 Action Information Transmitter
30 Content Database
40 Action Log Information Database
53 Item Object
54 Display Object
542 Illustration Image
101 Processor
A1 First Avatar
A3 Third Avatar
IM2 Content Image
P1 Server Program
P2 Client Program

The invention claimed is:

1. A content provision system, comprising at least one processor configured to:
arrange, in a virtual space, a first avatar corresponding to a first user viewing a first content representing the virtual space;
generate action log information that records:
action information indicating an action of the first avatar operated by the first user while the first user views the first content, the action information including information for reproducing a motion of the first avatar as the action of the first avatar; and
specific action information indicating a timing of performance of a predetermined specific action by the first avatar and a detail of the specific action, the specific action extracted from the action information, and the specific action including an action for selecting a predetermined item object out of one or more item objects registered in advance and generating the selected item object in the virtual space;
distribute a second content that is the same as the first content viewed by the first user in the past and reproduce in the second content the action of the first avatar recorded in the past, based on the action information contained in the action log information, when a second user views the second content in real time after the first user viewed the first content in the past; and
refer to the specific action information contained in the action log information and arrange in the second content a display object in association with the reproduced first avatar at a same timing as the recorded timing of performance of the specific action by the first avatar, the display object indicating the detail of the specific action recorded in the past.

2. The content provision system according to claim 1, wherein
the first content and the second content each include educational content showing a scene of a lesson, and
the specific action is extracted from the action information and includes the action for:
selecting the predetermined item object out of the one or more item objects registered in advance as items to be used for learning the lesson; and
generating the selected item object in the virtual space.

3. The content provision system according to claim 2, wherein the display object includes an image showing the item object.

4. The content provision system according to claim 1, wherein if there is a third user viewing the second content at the same time as the second user, the at least one processor displays a third avatar corresponding to the third user in a different display mode from that of the first avatar, when the second user views the second content.

5. The content provision system according to claim 1, wherein the at least one processor switches display and non-display of the first avatar based on an instruction operation from the second user, while the second user views the second content.

6. The content provision system according to claim 1, wherein
the first avatar includes a plurality of first avatars,
the first user includes a plurality of first users, and
the at least one processor generates the action log information for the plurality of first avatars corresponding to the plurality of first users, and selects a predetermined number of the first avatars as reproduction targets, when the second user views the second content.

7. The content provision system according to claim 6, wherein the at least one processor selects the predetermined number of the first avatars by prioritizing the first avatars having more recently generated action log information.

8. The content provision system according to claim 6, wherein the at least one processor selects the predetermined number of the first avatars by prioritizing the first avatars having the higher number of recorded pieces of the specific action information in the action log information.

9. A content provision method, comprising:
arranging, in a virtual space, a first avatar corresponding to a first user viewing a first content representing the virtual space;
generating action log information that records:

action information indicating an action of the first avatar operated by the first user while the first user views the first content, the action information including information for reproducing a motion of the first avatar as the action of the first avatar; and specific action information indicating a timing of performance of a predetermined specific action by the first avatar and a detail of the specific action, the specific action extracted from the action information, and the specific action including an action for selecting a predetermined item object out of one or more item objects registered in advance and generating the selected item object in the virtual space;

distributing a second content that is the same as the first content viewed by the first user in the past and reproducing in the second content the action of the first avatar recorded in the past, based on the action information contained in the action log information, when a second user views the second content in real time after the first user viewed the first content in the past; and referring to the specific action information contained in the action log information and arranging in the second content a display object in association with the reproduced first avatar at a same timing as the recorded timing of performance of the specific action by the first avatar, the display object indicating the detail of the specific action recorded in the past.

10. The content provision method according to claim 9, wherein
the first content and the second content each include educational content showing a scene of a lesson, and
the specific action is extracted from the action information and includes the action for:
selecting the predetermined item object out of the one or more item objects registered in advance as items to be used for learning the lesson; and
generating the selected item object in the virtual space.

11. The content provision method according to claim 9, further comprising, if there is a third user viewing the second content at the same time as the second user, displaying a third avatar corresponding to the third user in a different display mode from that of the first avatar, when the second user views the second content.

12. The content provision method according to claim 9, further comprising switching display and non-display of the first avatar based on an instruction operation from the second user, while the second user views the second content.

13. The content provision method according to claim 9, wherein
the first avatar includes a plurality of first avatars,
the first user includes a plurality of first users, and
the method further comprises generating the action log information for the plurality of first avatars corresponding to the plurality of first users, and selecting a predetermined number of the first avatars as reproduction targets, when the second user views the second content.

14. The content provision method according to claim 13, wherein selecting the predetermined number of the first avatars includes prioritizing the first avatars having more recently generated action log information.

15. The content provision method according to claim 13, wherein selecting the predetermined number of the first avatars includes prioritizing the first avatars having the higher number of recorded pieces of the specific action information in the action log information.

16. A non-transitory computer-readable medium storing therein a content provision program that, when executed, causes a computer to perform processes comprising:
arrange, in a virtual space, a first avatar corresponding to a first user viewing a first content representing the virtual space;
generate action log information that records:
action information indicating an action of the first avatar operated by the first user while the first user views the first content, the action information including information for reproducing a motion of the first avatar as the action of the first avatar; and
specific action information indicating a timing of performance of a predetermined specific action by the first avatar and a detail of the specific action, the specific action extracted from the action information, and the specific action including an action for selecting a predetermined item object out of one or more item objects registered in advance and generating the selected item object in the virtual space;
distribute a second content that is the same as the first content viewed by the first user in the past and reproduce in the second content the action of the first avatar recorded in the past, based on the action information contained in the action log information, when a second user views the second content in real time after the first user viewed the first content in the past; and
refer to the specific action information contained in the action log information and arrange in the second content a display object in association with the reproduced first avatar at a same timing as the timing of performance of the specific action by the first avatar, the display object indicating the detail of the specific action recorded in the past.

17. The non-transitory computer-readable medium according to claim 16, wherein
the first content and the second content each include educational content showing a scene of a lesson,
the specific action is extracted from the action information and includes the action for:
selecting the predetermined item object out of the one or more item objects registered in advance as items to be used for learning the lesson; and
generating the selected item object in the virtual space, and the display object includes an image showing the item object.

18. The non-transitory computer-readable medium according to claim 16, wherein the processes further include, if there is a third user viewing the second content at the same time as the second user, displaying a third avatar corresponding to the third user in a different display mode from that of the first avatar, when the second user views the second content.

19. The non-transitory computer-readable medium according to claim 16, wherein the processes further include switching display and non-display of the first avatar based on an instruction operation from the second user, while the second user views the second content.

20. The non-transitory computer-readable medium according to claim 16, wherein
the first avatar includes a plurality of first avatars,
the first user includes a plurality of first users, and
the processes further include generating the action log information for the plurality of first avatars corresponding to the plurality of first users, and selecting a predetermined number of the first avatars as reproduction targets, when the second user views the second content.

* * * * *